Patented May 22, 1945

2,376,498

UNITED STATES PATENT OFFICE 2,376,498

AQUEOUS BITUMINOUS EMULSIONS

Robert W. Martin, Savannah, Ga., assignor to Hercules Powder Company, Wilmington, Del., a corporation of Delaware No Drawing. Application December 5, 1941,
Serial No. 421,773

6 Claims. (Cl. 252—311.5)

This invention relates to an improved emulsifying agent, and in particular concerns a soap-type emulsifying agent especially adapted for use in the preparation of aqueous bituminous emulsions and the like. It also concerns improved bituminous and asphaltic emulsions comprising the new emulsifying agent.

In my copending application, Serial No. 303,818, filed November 10, 1939, now Patent No. 2,265,181, issued December 9, 1941, of which this application is a continuation-in-part, there is described a new resinous material prepared by heating ligneous resinous wood, or a mixture of a ligneous substance and a resin acid material, in the presence of water at an elevated temperature and under super-atmospheric pressure. This resinous material, herein termed "wood digestion resin," is a hard, dark-colored substance, usually having a drop melting point above about 100° C. In some instances it may melt at temperatures as high as 250° C. In general, it is substantially insoluble in petroleum hydrocarbons, such as gasoline, but is readily soluble in acetone, ethanol, ethyl acetate, methanol, methyl isobutyl ketone, butyl acetate, and similar organic solvents. It is only partially soluble in aromatic hydrocarbons such as toluene and xylene. Other properties and characteristics of this resin are more fully pointed out hereinafter and in the above-mentioned parent application.

The present invention is based on the discovery that a wood digestion resin, such as described in the above application, may be saponified with an aqueous alkali, such as sodium or potassium hydroxide, to form a soap-like product having excellent emulsifying properties. Because of its low cost, and the good stability and viscosity characteristics of the emulsion prepared therewith, this emulsifying agent is particularly adapted to use in the manufacture of aqueous bituminous and asphaltic emulsions or dispersions of the oil-in-water type, such as those so widely employed in the road surfacing art. Accordingly, the invention consists in the new saponified wood digestion resin emulsifying agent and in improved aqueous bituminous and asphaltic emulsions comprising the same.

The following examples will illustrate several ways in which the principle of the invention has been applied, but are not to be construed as limiting the same.

EXAMPLE 1

A quantity of wood digestion resin was prepared by impregnating 150 parts by weight of spent pine wood chips, i. e., chips from which the turpentine and rosin had been extracted, with a solution of 50 parts by weight of B wood rosin in 400 parts by weight of acetone. The acetone was then removed by evaporation and the impregnated chips were covered with 550 parts by weight of water in an autoclave. The autoclave was heated at a temperature of about 260°–270° C. for one hour, during which time a pressure of about 950–1000 pounds per square inch was developed. The autoclave was then cooled and vented to relieve the pressure, after which the resin product was removed and separated from the water. After heating to drive off gases, moisture and other volatile products, the wood digestion resin was obtained as a hard, brittle, dark-colored resinous solid, having the following characteristics:

| | |
|---|---|
| Softening point _____ °C__ | 177 |
| Acid No_____ | 40 |
| Saponification No_____ | 89 |
| Toluene insoluble_____per cent__ | 48 |
| Unsaponifiable tables_____do____ | 10 |
| Ash _____do____ | 1.3 |

Approximately 100 parts by weight of this resin was pulverized finer than 80 mesh and suspended in 250 parts by weight of a 0.4 per cent by weight aqueous solution of sodium hydroxide. A solution of 6 parts by weight of sodium hydroxide in 50 parts by weight of water was then added to the resin suspension, and the mixture was stirred to keep the resin particles in suspension until the saponification reaction was complete. There was thus obtained an approximately 25 per cent by weight aqueous dispersion of the saponified resin. This dispersion was employed in preparing an aqueous asphalt emulsion as follows: Approximately 20 parts by weight of the saponified resin dispersion (amounting to about 5 parts by weight on a dry basis) was diluted with 400 parts by weight of water containing 1 part by weight of sodium hydroxide. The resulting solution was then heated to a temperature of about 75° C., and 600 parts by weight of molten Texas asphalt was added gradually with rapid stirring. The mixture was then passed through a colloid mill to obtain complete emulsification. The emulsion so obtained had a 1/50 N. CaCl$_2$ demulsibility value of zero, and a 1/10 N. CaCl$_2$ demulsibility value of about 45%. A similar asphalt emulsion containing 10 parts by weight of the saponified resin dispersion had a 1/10 N. CaCl$_2$ demulsibility value of about 30%.

EXAMPLE 2

A sample of wood digestion resin prepared by heating equal parts of B wood rosin and spent pine wood chips in the presence of water was saponified in the cold with aqueous sodium hydroxide in a manner similar to that described in Example 1. Approximately 32 parts by weight of the saponified resin dispersion (about 8 parts by weight on a dry basis) was then dissolved in 400 parts by weight of water containing 2 parts by weight of sodium hydroxide, and 600 parts by weight of molten Texas asphalt was added gradually with rapid stirring. After passing the mixture through a colloid mill there was obtained a stable asphalt emulsion having $\frac{1}{50}$ N. and $\frac{1}{10}$ N. CaCl$_2$ demulsibility values of zero, and a furol viscosity of about 26 seconds at 25° C.

EXAMPLE 3

A number of asphalt emulsions were prepared as described in Example 2 employing varying amounts of the emulsifying agent and free sodium hydroxide. The compositions of these emulsions and their respective demulsibility and viscosity characteristics are tabulated below:

Table

| Emulsion No. | 1 | 2 | 3 | 4 | 5 | 6 |
|---|---|---|---|---|---|---|
| Asphalt [1] | 600 | 600 | 600 | 600 | 600 | 600 |
| Water [1] | 400 | 400 | 400 | 400 | 400 | 400 |
| Saponified wood digestion resin (dry basis) | 3 | 5 | 8 | 10 | 15 | 20 |
| Sodium hydroxide [1] | 1 | 1 | 1 | 2 | 2 | 2 |
| $\frac{1}{50}$ N. CaCl$_2$ demulsibility value ____ per cent | 55 | 35 | Nil | | | |
| $\frac{1}{10}$ N. CaCl$_2$ demulsibility value ____ per cent | 68 | 52 | Trace | Nil | Nil | Nil |
| Viscosity (furol at 25° C.), Secs | 39 | 29 | 27 | 32 | 67 | 61 |

[1] Parts by weight.

EXAMPLE 4

Approximately 100 parts by weight of the wood digestion resin described in Example 1 was pulverized and stirred into 100 parts of a 10 per cent by weight aqueous solution of potassium hydroxide. Stirring was continued for several minutes, after which the mixture was heated to boiling to complete the saponification reaction. The saponified resin dispersion so obtained was a thin dark-colored paste containing about 50 per cent by weight of solids. Asphalt emulsions in which this dispersion was employed as the emulsifying agent were similar to those described in Example 3.

As hereinbefore mentioned, the wood digestion resin which is saponified to form the new emulsifying agent provided by the invention is prepared according to the process described and claimed in co-pending application, Serial No. 303,818, filed November 10, 1939 now Patent No. 2,265,181, issued December 9, 1941. Such process consists essentially in heating a ligneous resinous cellulosic material, such as pine wood containing 15–25 per cent by weight of rosin, at an elevated temperature, e. g., between about 240° C. and about 330° C., and under super-atmospheric pressure while submerged in water until the fibrous structure of the material is destroyed and resinification takes place. Alternatively, a non-resinous ligneous material may be mixed or impregnated with a resin acid substance, e. g., crude rosin, and subjected to the same treatment. According to a preferred mode of operation, dead pine stump wood, or a mixture of crude rosin and spent pine wood chips from which the turpentine and rosin have been extracted, is placed in a stainless steel autoclave and covered with water. The autoclave is then heated to a temperature of about 240°–330° C., preferably 250°–280° C., for a period of time varying from about two minutes to about six hours, depending upon the particular kind of wood and temperature employed. During the heating, the autogenous pressure within the autoclave may vary from 400 to 1900 pounds per square inch. The autoclave is then allowed to cool and is vented to release the pressure, after which the resin product is removed and separated from the water. Usually, the resin is then heated to a temperature of about 175–275° C. to expel dissolved gases, water and volatile organic materials. Other methods of preparing resinous substances by the digestion of cellulosic materials in the presence of water may be employed if desired.

As will be apparent from the foregoing examples, the reaction by which the wood digestion resin is saponified to form the new emulsifying agent takes place readily in the cold, although if desired it may be hastened materially by mild heating. Ordinarily, it will be found preferable merely to stir the finely divided resin into an aqueous solution of an alkaline alkali-metal compound, such as sodium hydroxide, potassium carbonate, potassium hydroxide, ammonium hydroxide, etc., maintained at room temperature or there-abouts. The proportion in which the alkaline saponifying agent is employed depends somewhat upon the particular agent and the desired degree of saponification, but is usually between about 5 and about 15 percent by weight of the wood digestion resin. The proportion of water may be varied between wide limits whereby the saponified product may range from a thin liquid containing 10 per cent by weight or less of solids to a thick paste containing as high as 75 per cent by weight of solids. If desired, it may be prepared in dry form by subjecting the aqueous product to drum or spray drying in the known manner.

Aqueous bituminous or asphaltic emulsions or dispersions are conveniently prepared with the aid of the new saponified wood digestion resin emulsifying agent by dispersing the latter in the aqueous phase, and thereafter adding the bituminous or asphaltic material in the molten state to the water in a fine stream and with rapid stirring. The mixture is then passed through a suitable dispersing machine or colloid mill to form a stable emulsion. If desired, a small amount of a free alkali may be added to the aqueous phase prior to emulsification for the purpose of improving the physical stability of the emulsion. Either natural asphalts or bitumins, such as California, Texas, Venezuelan or Trinidad asphalts, or artificial bituminous materials, such as coal tar pitch, stearine pitch, petroleum pitches, etc., may be emulsified in this manner. The emulsifying agent is usually employed in an amount representing between 0.25 and about 10 per cent by weight, preferably between about 0.75 and about 5 per cent by weight, of the aqueous phase, although the optimum proportion will depend upon the nature of the non-aqueous phase as well as the breaking characteristics desired in the emulsion. In some instances it may be desirable to modify such breaking characteristics through the use of minor amounts of other emulsifying agents, such as fatty acid soaps, sulphonated oils, etc., or to include stabilizing agents, such as casein, glue, blood albumen, carbohydrates, etc.

The aqueous bituminous or asphaltic emulsions comprising the new saponified wood digestion resin emulsifying agent are characterized by excellent chemical stability, which, if desired, however, may be varied between wide limits to meet particular conditions of application simply by varying the proportion of emulsifying agent. They also have good physical stability and do not separate or settle upon storage for long periods of time. The emulsifying agent itself is characterized by exceptionally low cost, being very readily manufactured from materials heretofore largely considered as waste prodcts, and by excellent emulsifying properties. For these reasons, it is particularly adapted to use in preparing the herein described bituminous emulsions, which must of necessity be of low cost, although it may be similarly employed with equal advantage in preparing aqueous emulsions or dispersions of a variety of other water-insoluble materials.

What I claim and desire to protect by Letters Patent is:

1. The saponification product of a water-soluble alkali and a wood digestion resin, said wood digestion resin being the resin produced by heating a ligneous wood and a material selected from the group consisting of natural resin acids and materials containing natural resin acids, with water in amount sufficient to substantially completely submerge the wood under superatmospheric pressure at a temperature within the range of about 240° C. to about 330° C. until the cellular structure of the wood has disappeared and recovering said resin as the residue remaining after removal of the water solution.

2. The sodium hydroxide saponification product of a wood digestion resin, said wood digestion resin being the resin produced by heating a ligneous wood and a material selected from the group consisting of natural resin acids and materials containing natural resin acids, with water in amount sufficient to substantially completely submerge the wood under superatmospheric pressure at a temperature within the range of about 240° C. to about 330° C. until the cellular structure of the wood has disappeared and recovering said resin as the residue remaining after removal of the water solution.

3. An aqueous bituminous emulsion comprising a bituminous material as the dispersed phase, water as the continuous phase, and an emulsifying agent comprising the saponification product of a water-soluble alkali and a wood digestion resin, said wood digestion resin being the resin produced by heating a ligneous wood and a material selected from the group consisting of natural resin acids and materials containing natural resin acids, with water in amount sufficient to substantially completely submerge the wood under superatmospheric pressure at a temperature within the range of about 240° C. to about 330° C. until the cellular structure of the wood has disappeared and recovering said resin as the residue remaining after removal of the water solution.

4. An aqueous bituminous emulsion comprising a bituminous material as the dispersed phase, water as the contiuous phase, and an emulsifying agent comprising the sodium hydroxide saponification product of a wood digestion resin, said wood digestion resin being the resin produced by heating a ligneous wood and a material selected from the group consisting of natural resin acids and materials containing natural resin acids, with water in amount sufficient to substantially completely submerge the wood under superatmospheric pressure at a temperature within the range of about 240° C. to about 330° C. until the cellular structure of the wood has disappeared and recovering said resin as the residue remaining after removal of the water solution.

5. An aqueous bituminous emulsion comprising a bituminous material as the dispersed phase, water as the continuous phase, and an emulsifying agent comprising the saponification product of a water-soluble alkali and a wood digestion resin in an amount representing between about 0.75 and about 5 per cent by weight of the aqueous aqueous phase, said wood digestion resin being the resin produced by heating a ligneous wood and a material selected from the group consisting of natural resin acids and materials containing natural resin acids, with water in amount sufficient to substantially completely submerge the wood under superatmospheric pressure at a temperature within the range of about 240° C. to about 330° C. until the cellular structure of the wood has disappeared and recovering said resin as the residue remaining after removal of the water solution.

6. An aqueous bituminous emulsion comprising a bituminous material as the dispersed phase, water as the continuous phase, and an emulsifying agent comprising the saponification product of a water-soluble alkali and a wood digestion resin in an amount representing between about 0.75 and about 5 per cent by weight of the aqueous phase, said wood digestion resin being the resin produced by heating a ligneous wood and a material selected from the group consisting of natural resin acids and materials containing natural resin acids, with water in amount sufficient to substantially completely submerge the wood under superatmospheric pressure at a temperature within the range of about 240° C. to about 330° C. until the cellular structure of the wood has disappeared and recovering said resin as the residue remaining after removal of the water solution.

ROBERT W. MARTIN.

CERTIFICATE OF CORRECTION.

Patent No. 2,376,498.                                                              May 22, 1945.

ROBERT W. MARTIN.

It is hereby certified that error appears in the printed specification of the above numbered patent requiring correction as follows: Page 3, second column, line 27, claim 5, strike out "0.75 and about 5 per cent by weight of the aqueous" and insert instead --0.25 and about 10 per cent by weight of the--; and that the said Letters Patent should be read with this correction therein that the same may conform to the record of the case in the Patent Office.

Signed and sealed this 18th day of September, A. D. 1945.

(Seal)

Leslie Frazer
First Assistant Commissioner of Patents.